(12) United States Patent
Hayashi et al.

(10) Patent No.: US 10,020,513 B2
(45) Date of Patent: Jul. 10, 2018

(54) SLURRY COMPOSITION FOR FORMING LITHIUM SECONDARY BATTERY ELECTRODE CONTAINING CELLULOSE FIBER AS BINDER, AND LITHIUM SECONDARY BATTERY ELECTRODE

(71) Applicants: NISSAN CHEMICAL INDUSTRIES, LTD., Tokyo (JP); IWATE UNIVERSITY, Morioka, Iwate (JP)

(72) Inventors: Hisato Hayashi, Funabashi (JP); Masaaki Ozawa, Funabashi (JP); Osamu Uesugi, Chiyoda-ku (JP); Yoshihiro Kadoma, Morioka (JP)

(73) Assignees: NISSAN CHEMICAL INDUSTRIES, LTD., Tokyo (JP); IWATE UNIVERSITY, Iwate (JP)

( * ) Notice: Subject to any disclaimer, the term of this patent is extended or adjusted under 35 U.S.C. 154(b) by 413 days.

(21) Appl. No.: 14/346,104

(22) PCT Filed: Sep. 20, 2012

(86) PCT No.: PCT/JP2012/074040
§ 371 (c)(1),
(2) Date: Mar. 20, 2014

(87) PCT Pub. No.: WO2013/042720
PCT Pub. Date: Mar. 28, 2013

(65) Prior Publication Data
US 2014/0248537 A1    Sep. 4, 2014

(30) Foreign Application Priority Data
Sep. 20, 2011   (JP) ................. 2011-204721

(51) Int. Cl.
*H01M 4/62*      (2006.01)
*H01M 4/485*     (2010.01)
*H01M 4/131*     (2010.01)
*H01M 10/052*    (2010.01)

(52) U.S. Cl.
CPC ........... *H01M 4/622* (2013.01); *H01M 4/485* (2013.01); *H01M 4/625* (2013.01); *H01M 4/131* (2013.01); *H01M 10/052* (2013.01); *Y02E 60/122* (2013.01); *Y02T 10/7011* (2013.01)

(58) Field of Classification Search
CPC ...... H01M 4/131; H01M 4/625; H01M 4/485; H01M 10/052; H01M 4/622; Y02E 60/122; Y02T 10/7011
USPC ............. 429/217; 252/507; 536/56
See application file for complete search history.

(56) References Cited

U.S. PATENT DOCUMENTS

| | | | |
|---|---|---|---|
| 2002/0127471 | A1 | 9/2002 | Siret et al. |
| 2011/0143206 | A1* | 6/2011 | Muthu ............... H01M 4/131 429/231 |
| 2011/0229760 | A1* | 9/2011 | Hidaka ............ H01M 4/0402 429/217 |
| 2012/0231341 | A1* | 9/2012 | Kim ..................... C01G 51/42 429/223 |

FOREIGN PATENT DOCUMENTS

| | | |
|---|---|---|
| EP | 2355215 A1 | 8/2011 |
| JP | A-2000-100439 | 4/2000 |
| JP | A-2002-42817 | 2/2002 |
| JP | A-2010-170993 | 8/2010 |
| WO | WO 2006/025148 A1 | 3/2006 |
| WO | WO 2010/061871 A1 | 6/2010 |
| WO | 2010/084622 A1 | 7/2010 |

OTHER PUBLICATIONS

Arbatan et al. in Cellulose nanofiber as binder for fabrication of superhydrophobic paper in "Chemical Engineering Journal" vol. 210 (2012) p. 74-79.*
Jabbour et all., "Microfibrillated Cellulose-Graphite Nanocomposites for Highly Flexible Paper-like Li-Ion Battery Electrodes", Journal of Materials Chemistry, Royal Society of Chemistry UK, vol. 20, No. 35, Aug. 2, 2010, pp. 7344-7347.
Gomez Camer et al., Nanosized Si/cellulose Fiber/Carbon Composites as High Capacity Anodes for Lithium-Ion Batteries: A Galvanostatic and Dilatometric Study, Electrochimica Acta, Elsevier Science Publishers, Barking, GB, vol. 54, No. 26, Nov. 1, 2009, pp. 6713-6717.
Buqa et al., "Study of Styrene Butadiene Rubber and Sodium Methyl Cellulose as Binder for Negative Electrodes in Lithium-Ion Batteries", Journal of Power Sources, Elsevier SA, CH, vol. 161, No. 1, Oct. 20, 2006, pp. 617-622.
Feb. 23, 2015 extended Search Report issued in European Application No. 12834075.9.
Written Opinion of the International Searching Authority issued in PCT/JP2012/074040 dated Nov. 20, 2012.
International Search Report issued in PCT/JP2012/074040 dated Nov. 20, 2012.

* cited by examiner

*Primary Examiner* — Mark F. Huff
*Assistant Examiner* — Omar M Kekia
(74) *Attorney, Agent, or Firm* — Oliff PLC (57) ABSTRACT

There is provided a novel slurry composition for forming a lithium secondary battery electrode which can improve homogeneity of an electrode active material and a conductive assistant even without using an organic solvent and can improve the binding of an electrode active material and a conductive assistant with an electrode collector, and a lithium secondary battery with improved charge/discharge cycle characteristics and battery capacity. A slurry composition for forming a lithium secondary battery electrode, characterized by comprising an electrode active material (A), a conductive assistant (B), and a pulverized cellulose fiber (C) as an aqueous binder, and a lithium secondary battery electrode and a lithium secondary battery which are obtained using the composition, and an aqueous binder used for the composition.

9 Claims, 4 Drawing Sheets

SLURRY COMPOSITION FOR FORMING LITHIUM SECONDARY BATTERY ELECTRODE CONTAINING CELLULOSE FIBER AS BINDER, AND LITHIUM SECONDARY BATTERY ELECTRODE

TECHNICAL FIELD

The present invention relates to an aqueous binder for use in production of a lithium secondary battery electrode using a cellulose fiber, a slurry composition for forming a lithium secondary battery electrode including the same, a lithium secondary battery electrode formed therewith, and a lithium secondary battery including the same.

BACKGROUND ART

In recent years, batteries for use in portable terminals including notebook computers and mobile phones, hybrid cars, electric vehicles, and power-assisted bicycles have been spreading rapidly, and further size reduction and weight reduction have been sought. Lithium-ion secondary batteries having the advantages of a high energy density and being lightweight have been used as the batteries (rechargeable batteries) for use in these various products.

A lithium-ion secondary battery generally includes a positive electrode including a positive electrode active material allowing doping and dedoping of lithium ions, a negative electrode including a negative electrode active material allowing doping and dedoping of lithium ions, and an electrolyte. The electrodes for lithium-ion secondary batteries are usually fabricated by applying a slurry for forming an electrode on an electrode collector and drying the slurry.

Examples of the slurry for forming an electrode include the one obtained by mixing and kneading an electrode active material such as a positive electrode active material or a negative electrode active material, a binder, and a dispersion medium. Organic solvent-based binders have mainly been used as a binder and dispersion medium. For example, typically, polyvinylidene fluoride (PVdF) or polytetrafluoroethylene (PTFE) is used as a binder and a polar solvent such as N-methyl-2-pyrrolidone (NMP) is used as a dispersion medium.

Cellulose has a number of hydroxy groups that can form hydrogen bonds in molecules and therefore can serve as an electrode binder excellent in binding with an electrode active material and an electrode collector. That is, if cellulose is used as an electrode binder, even on the occurrence of stress on the electrode during an electrode production process, absorption and desorption of lithium ions in charge/discharge cycles, and volumetric changes of the electrode itself due to temperature changes, it is possible to alleviate the stress, to prevent separation and dropping-off of the electrode collector from the electrode active material, and to suppress reduction in adhesiveness (see Patent Document 1).

The organic solvent-based binders conventionally studied are excellent in binding between the collector and the electrode active material but, in terms of costs and in view of environmental conservation, has an issue that the use of an organic solvent is necessary when the slurry for forming an electrode is kneaded and applied. New binder compositions using no organic solvent, therefore, have been studied, and the use of a resin dissolving or dispersing in water as a binder has been attempted. When such an aqueous slurry is used as a binder, the cellulose-based compounds may be used in combination in order to improve dispersiveness of the electrode active material etc. in the slurry, to improve charge/discharge cycle characteristics, and to improve the battery capacity retention ratio (see Patent Document 2).

PRIOR ART DOCUMENTS

Patent Documents

Patent Document 1: Japanese Patent Application Publication No. 2000-100439 (JP 2000-100439 A)
Patent Document 2: Japanese Patent Application Publication No. 2010-170993 (JP 2010-170993 A)

SUMMARY OF THE INVENTION

Problem to be Solved by the Invention

The conventional techniques studied so far have big issues in terms of costs and in view of environmental conversation because it is necessary to use an expensive binder in order to develop a desired battery capacity or desired charge/discharge cycle characteristics in a lithium-ion secondary battery, and the use of an organic solvent is also necessary as previously mentioned.

On the other hand, when an aqueous binder is used, the binding of the active material with the electrode collector is low when compared with organic solvent-based binders, and a sufficient battery capacity is not obtained, for example. Further improvement is thus demanded in view of practicability.

The present invention was made in view of the aforementioned situations and aims to provide a novel slurry composition for forming a lithium secondary battery electrode which can improve homogeneity of an electrode active material and a conductive assistant even without using an organic solvent and can improve the binding of an electrode active material and a conductive assistant with an electrode collector.

The present invention also aims to provide a lithium secondary battery with improved charge/discharge cycle characteristics and battery capacity, which includes an electrode formed with the slurry composition for forming a lithium secondary battery electrode.

Means for Solving the Problem

The inventors of the present invention have made intensive studies in order to achieve the aforementioned objects, and noted that when water is removed from a water dispersion liquid of pulverized cellulose fiber, the cellulose fiber forms a mesh-like structure. The inventors have found that not only the conventional issues (costs and environmental safety) of using organic solvents can be eliminated but also the practical issue of binding of the active material with the electrode collector as well as battery capacity, which are insufficient with aqueous binders studied so far, can be improved by employing the pulverized cellulose fiber as a binder in a slurry composition for forming a lithium secondary battery electrode, in place of the cellulose-based compounds conventionally studied. This finding has led to the completion of the present invention.

The present invention relates to a slurry composition for forming a lithium secondary battery electrode, characterized by comprising: an electrode active material (A); a conductive assistant (B); and a pulverized cellulose fiber (C) as an aqueous binder.

The pulverized cellulose fiber (C) preferably has a particle diameter of 0.01 µM to 40 µm at 50% of cumulative volume, which is measured using a laser diffraction/scattering particle size distribution analyzer with water serving as a dispersion medium.

The pulverized cellulose fiber (C) is preferably prepared by a wet milling process selected from the group consisting of a high-pressure homogenizer, a grinder (stone mill-type crusher), and a medium stirring mill.

The pulverized cellulose fiber (C) is preferably prepared from a plant-derived cellulose or a bacteria cellulose.

The electrode active material (A) is, for example, a lithium-titanium composite oxide.

The conductive assistant (B) is preferably graphite powder, carbon black, a carbon nanotube, or a carbon nanofiber.

The present invention also relates to a lithium secondary battery electrode comprising: an electrode collector; and a layer formed on the electrode collector using the slurry composition for forming a lithium secondary battery electrode.

The present invention also relates to a lithium secondary battery characterized by comprising the lithium secondary battery electrode as a positive electrode, a negative electrode, or a positive electrode and a negative electrode.

The present invention further relates to an aqueous binder for forming an electrode layer including an electrode active material (A) and a conductive assistant (B) on an electrode collector, characterized by comprising a pulverized cellulose fiber (C).

Effects of the Invention

The slurry composition for forming a lithium secondary battery electrode according to the present invention can improve the homogeneity of the electrode active material and the conductive assistant in the composition, is excellent in applicability onto the electrode collector, and provides excellent binding of the electrode active material and the conductive assistant with the electrode collector.

The lithium secondary battery electrode according to the present invention is excellent in binding of the electrode active material and the conductive assistant with the electrode collector. The lithium secondary battery including this electrode can achieve a discharge cycle characteristic and a battery capacity equivalent to or exceeding a lithium secondary battery fabricated using a conventional organic solvent-based binder.

The lithium secondary battery electrode according to the present invention is excellent in a battery characteristic at low temperature. A lithium secondary battery including this electrode can achieve a discharge cycle characteristic and a battery capacity, under low temperature conditions, equivalent to or exceeding a lithium secondary battery fabricated using a conventional organic solvent-based binder and a lithium secondary battery fabricated using a conventional water-soluble polymer binder.

MODES FOR CARRYING OUT THE INVENTION

A slurry composition for forming a lithium secondary battery electrode and a lithium secondary battery electrode formed therewith, a lithium secondary battery, and an aqueous binder for use in the slurry composition according to the present invention will be described in order below.

[Slurry Composition for Forming Secondary Battery Electrode]

The slurry composition for forming a secondary battery electrode according to the present invention is characterized by containing an electrode active material (A), a conductive assistant (B), and a pulverized cellulose fiber (C) as an aqueous binder.

<Aqueous Binder: Pulverized Cellulose Fiber (C)>

The biggest feature of the slurry composition according to the present invention is that the pulverized cellulose fiber (C) is used as an aqueous binder. The pulverized cellulose fiber (C) is actually used in the form of a cellulose fiber dispersion liquid described later and acts as a useful binder for binding an electrode layer including the electrode active material (A) and the conductive assistant (B) on the electrode collector, because the cellulose fiber forms a mesh-like structure when water is removed from the dispersion liquid during formation of the electrode of a secondary battery.

Raw materials used in production of conventional cellulose fibers can be widely used as the cellulose serving as a raw material of the pulverized cellulose fiber used in the present invention. Examples of the raw materials used may include plant-derived celluloses such as wood, bamboo, hemp, jute, kenaf, agricultural products, and food residues, and microorganism or animal-derived celluloses such as bacteria celluloses and ascidian celluloses. These celluloses may be used singly or in combination of two or more.

Among those, a plant-derived cellulose or a bacteria cellulose is preferably used as the raw material.

In the present invention, these cellulose raw materials are milled, and the pulverized cellulose fiber is used. Although the method of milling cellulose is not limited, a method that provides a strong shear force, such as a high-pressure homogenizer, a grinder (stone mill-type crusher), or a medium stirring mill such as a bead mill, is preferred in order to achieve pulverization to a fiber diameter suited for the object of the present invention. Among those, a high-pressure homogenizer is preferably used for pulverization. For example, a wet milling process as disclosed in Japanese Patent Application Publication No. 2005-270891 (JP 2005-270891 A) can be used. More specifically, the cellulose is milled by spraying a water dispersion liquid including dispersed cellulose from a pair of nozzles at high pressure so as to come into collision. For example, a Star Burst System (a high-pressure milling machine manufactured by Sugino Machine Limited) can be used.

When cellulose fiber is pulverized using a high-pressure homogenizer, the degree of pulverization and homogenization depends on the pressure for pressure-feed to the ultra-high pressure chamber of the high-pressure homogenizer, the number of times (number of times of process) of passage through the ultra-high pressure chamber, and the cellulose concentration in the water dispersion liquid.

The feeding pressure (process pressure) is usually 50 MPa to 250 MPa, preferably 100 MPa to 245 MPa. When the feeding pressure is less than 50 MPa, the pulverization of cellulose fiber is insufficient, and the expected effect by pulverization cannot be obtained.

The cellulose concentration in the water dispersion liquid in the pulverization process is 0.1% by mass to 30% by mass, preferably 1% by mass to 10% by mass. If the cellulose concentration in the water dispersion liquid is less than 0.1% by mass, the productivity is significantly low. If the cellulose concentration is higher than 30% by mass, the milling efficiency is low, and the desired pulverized cellulose fiber cannot be obtained.

The number of times of the pulverization process depends on the cellulose concentration in the water dispersion liquid. When the cellulose concentration is 0.1% by mass to 1% by mass, the number of times of the process about from 10 passes to 50 passes will suffice for pulverization. When the concentration is 1% by mass to 10% by mass, about 50 passes to 200 passes are required. When the concentration is as high as over 30% by mass, the number of times of the process needs to be a few hundred or more, which is unrealistic in an industrial point of view.

The pulverization of the pulverized cellulose fiber (C) used in the present invention is evaluated using, for example, a laser diffraction/scattering particle size distribution analyzer. In the present invention, it is preferable to use a cellulose fiber having a particle diameter (median diameter) of 0.01 μm to 40 μm, particularly preferably 0.05 μm to 10 μm at 50% of cumulative volume when the volumetric particle size distribution of a water dispersion liquid of the cellulose fiber obtained by the wet milling process or the like is measured.

If the particle diameter is less than 0.01 μm, the cellulose fiber is too short to obtain the effect of addition, that is, improvement in binding of the electrode layer including the electrode active material and the conductive assistant with the electrode collector cannot be brought about in a secondary battery electrode obtained using the slurry composition for forming a lithium secondary battery electrode subsequently obtained. If the particle diameter is greater than 40 μm, the pulverization of the cellulose fiber is insufficient, that is, the homogeneity of the electrode layer is insufficient, so that the expected effect cannot be achieved.

The fiber diameter of the pulverized cellulose fiber used in the present invention is 0.001 μm to 10 μm, preferably 0.01 μm to 1 μm, though not limited thereto. The aspect ratio (L/D) is 10 to 100,000, preferably 100 to 10,000, though not limited thereto.

The pulverized cellulose fiber used in the present invention can be used in the form of a water dispersion liquid of the cellulose fiber obtained by the wet milling process to prepare a slurry composition.

The present invention is also directed to an aqueous binder including the pulverized cellulose fiber thus obtained.

The amount of the pulverized cellulose fiber (C) in the slurry composition for forming a lithium secondary battery electrode is generally, for example, 0.01 parts by mass to 50 parts by mass, more preferably 0.1 parts by mass to 20 parts by mass with respect to 100 parts by mass of the total solid content in the slurry composition.

<Electrode Active Material (A)>

Examples of the electrode active material (A) included in the slurry composition for forming a lithium secondary battery electrode according to the present invention include positive electrode active materials and negative electrode active materials.

Examples of the positive electrode active materials are oxides, phosphate compounds, sulfides, silicate compounds, and fluorides including lithium and a transition metal, such as lithium-manganese composite oxides, lithium-nickel composite oxides, lithium-cobalt composite oxides, lithium-iron composite oxides, lithium-manganese-cobalt composite oxides, lithium-nickel-manganese composite oxides, lithium-nickel-manganese-cobalt composite oxides, lithium-transition metal phosphate compounds, and lithium-transition metal sulfate compounds. A combination of two or more kinds of positive electrode active materials or a composite with a conductive material may be used as an electrode active material.

Among the positive electrode active materials listed above, in particular, iron lithium phosphate is preferred. The reason for this is that $PO_4$ polyanion in the structure is thermally stable, so that high safety can be expected when compared with conventional positive electrode active materials, and a good capacity retention characteristic is exhibited. Another reason is that iron serving as the central metal is suitable for mass production because of its abundant resource reserves, low costs, and low environmental load.

Examples of the negative electrode active materials include carbon materials such as amorphous carbon, graphite, hard carbon, natural graphite, carbon black, and carbon nanotubes, lithium-transition metal compounds such as oxides, sulfides, nitrides, and fluorides, typified by lithium-titanium oxides (LTOs), metal materials, and lithium alloys such as lithium-aluminum alloys, lithium-tin alloys, and lithium-silicon alloys. A combination of two or more kinds of negative electrode active materials or a composite with a conductive material may be used as an electrode active material.

Among the negative electrode active materials listed above, in particular, a lithium-titanium composite oxide is preferred. The reason is as follows. Carbon electrodes conventionally used as negative electrodes have a low operating potential (0.9 V vs $Li/Li^+$) and thus have drawbacks that metal lithium is likely to be deposited and an internal short circuit is likely to occur. By contrast, a lithium-titanium composite oxide exhibits a high operating potential (1.55 V vs $Li/Li^+$) and high safety can be expected because a solid electrolyte interphase (SEI) is unlikely to be formed. A lithium-titanium composite oxide is also preferable because a volumetric change during charge/discharge is small, and improvement in battery life can be expected.

The amount of the electrode active material (A) in the slurry composition for forming a lithium secondary battery electrode according to the present invention is generally, for example, 50 parts by mass to 99.9 parts by mass, more preferably 80 parts by mass to 99.0 parts by mass with respect to 100 parts by mass of the total solid content in the slurry composition, though not particularly limited thereto.

If the blended amount of the electrode active material is less than 50 parts by mass, a sufficient battery capacity cannot be obtained, and the charge/discharge cycle characteristic is also unfavorable. If the blended amount is greater than 99.9 parts by mass, the amount of the aqueous binder (the pulverized cellulose fiber (C)) added becomes insufficient, so that the affinity for the electrode collector is low, the applicability is unfavorable, and the binding of the electrode subsequently obtained is insufficient, resulting in poor durability, for example, separation or dropping-off of the active material from the electrode is induced by charge/discharge.

<Conductive Assistant (B)>

Carbon materials can be used as the conductive assistant (B) included in the slurry composition for forming a lithium secondary battery electrode according to the present invention. Examples of the carbon materials include graphite powder, carbon black (for example, acetylene black (AB), ketjen black), and fibrous carbon materials (for example, carbon nanotubes, carbon nanofibers). Among those, carbon black is particulate and has a large surface area, and the addition of a small amount of carbon black to the slurry composition according to the present invention can enhance conductivity in the inside of the resulting electrode and improve the charge/discharge efficiency and the large-current discharge characteristic.

The amount of the conductive assistant (B) in the slurry composition for forming a lithium secondary battery electrode according to the present invention is generally, for example, 0.1 parts by mass to 20 parts by mass, more preferably 0.5 parts by mass to 10 parts by mass with respect to 100 parts by mass of the total solid content in the slurry composition, though not particularly limited thereto.

<Other Components>

The slurry composition for forming a lithium secondary battery electrode according to the present invention may include a water-soluble polymer as a dispersant for the electrode active material (A) and the conductive assistant (B). Examples of the water-soluble polymer include methylcellulose, carboxymethyl cellulose (CMC), polyethylene glycol, polyvinyl alcohol, polyvinyl pyrrolidone, polyacrylic acid (PAA), and styrene-butadiene rubber (SBR). A combination of two or more kinds of those water-soluble polymers may be used as a dispersant.

The amount of the dispersant used in the slurry composition for forming a lithium secondary battery electrode according to the present invention is preferably not less than 1 part by mass and not more than 1000 parts by mass, further preferably not less than 10 parts by mass and not more than 500 parts by mass with respect to 100 parts by mass of the pulverized cellulose fiber (C).

<Preparation Method for Slurry Composition for Forming Lithium Secondary Battery Electrode>

In the slurry composition for forming a lithium secondary battery electrode according to the present invention, it is preferable that the electrode active material (A) and the conductive assistant (B) contained be uniformly dispersed in the composition. The preparation method is not particularly limited. For example, the slurry composition may be prepared by simultaneously performing pulverization of a cellulose raw material and mixing or dispersion of the electrode active material and the conductive assistant in a state in which the cellulose raw material and the electrode active material and the conductive assistant coexist, in the wet milling process for producing the pulverized cellulose fiber as an aqueous binder.

Alternatively, for example, the slurry composition may be prepared by preparing the pulverized cellulose fiber as an aqueous binder and thereafter performing wet kneading using a mortar or the like in a state in which the fiber and the electrode active material and the conductive assistant coexist.

[Lithium Secondary Battery Electrode]

The lithium secondary battery electrode according to the present invention is formed to include an electrode collector and a layer formed on the electrode collector with the slurry composition for forming a lithium secondary battery electrode, that is, an electrode active material layer. The electrode active material layer is a layer that includes an active material playing a key role of a charge/discharge reaction.

The electrode collector for use in the lithium secondary battery electrode according to the present invention is selected from conductive materials including aluminium, nickel, copper, and stainless steel (SUS). The electrode collector may be in the shape of, for example, a foil, a flat plate, a mesh, a net, a lath, a punched metal, or an embossment, or a combination thereof. Preferably, a foil-like shape is used. Although a general thickness of the electrode collector is 1 μm to 30 μm, an electrode collector having a thickness out of this range may be used.

The electrode active material layer is formed by, for example, applying the slurry composition for forming a lithium secondary battery electrode onto the electrode collector and drying the resulting coating film.

The method of applying the slurry composition for forming an electrode onto the electrode collector is not particularly limited. For example, generally used techniques such as a roll coater, a blade coater, a bar coater, and a die coater may be employed.

Means for drying the coating film formed on the surface of the electrode collector after the application is not particularly limited. For example, conventionally known techniques in electrode production, such as heat drying, air-blow drying, and reduced pressure drying, can be employed. The conditions of drying the coating film (drying time, drying temperature, and the like) can be appropriately selected from 40° C. to 100° C. and from one hour to 24 hours, depending on the amount of the applied slurry composition for forming an electrode and the rate of water vaporization from the slurry composition, for example.

The thickness of the electrode active material layer thus obtained is generally 0.01 μm to 100 μm, preferably 1 μm to 50 μm.

Examples of the lithium secondary battery include a lithium metal secondary battery, a lithium ion secondary battery, a lithium polymer secondary battery, and a lithium ion polymer secondary battery. The lithium secondary battery electrode according to the present invention is used as, for example, an electrode for a lithium ion secondary battery.

[Lithium Secondary Battery]

The lithium secondary battery according to the present invention is the one including the lithium secondary battery electrode as at least one of a positive electrode and a negative electrode. More specifically, the lithium secondary battery according to the present invention includes an electrode obtained by applying the slurry composition for forming a lithium secondary battery electrode including a positive electrode active material or a negative electrode active material, onto an electrode collector and drying the coating.

The electrolyte solution of the lithium secondary battery is, for example, the one used in the form of liquid or gel, though not particularly limited thereto, and can be selected appropriately from those fulfilling the function as a secondary battery, depending on the kind of the negative electrode active material or the positive electrode active material.

Examples of the electrolyte include electrolytes of electrolyte solutions normally used in conventional lithium secondary batteries, such as $LiClO_4$, $LiBF_4$, $CF_3SO_3Li$, $LiI$, $LiAlCl_4$, and $LiPF_6$.

Examples of the solvent of the electrolyte solution include ethers, ketones, lactones, nitriles, amines, amides, sulfur compounds, chlorinated hydrocarbons, esters, carbonates, nitro compounds, and phosphoric ester compounds. In general, carbonates such as ethylene carbonate and diethyl carbonate are preferred.

When the lithium secondary battery electrode is used as a positive electrode, the active materials listed above as <negative electrode active materials> can be used for the opposite, negative electrode. When the lithium secondary battery electrode is used as a negative electrode, the active materials listed above as <positive electrode active materials> can be used for the opposite, positive electrode. These active materials each supported on the electrode collector with a binder can be used as a negative electrode or a positive electrode. Alternatively, the active materials can be used singly. For example, a metal or an alloy alone can be used as an electrode.

The lithium secondary battery according to the present invention is not particularly limited in shape and the like and may be, for example, coin-shaped, button-shaped, sheet-shaped, laminated, cylindrical, flat, prismatic, or of a large type for use in electric vehicles or the like.

The lithium secondary battery according to the present invention has a high capacity and a long life. Taking advantage of these features, the lithium secondary battery according to the present invention can be suitably used in a variety of applications in which conventionally known lithium secondary batteries are used, including power sources for small and multi-function portable equipment.

EXAMPLES

The features of the present invention will be described below more specifically with examples and comparative examples. The materials, the use amounts, the proportions, the process contents, the process procedures, and the like shown in the following examples can be changed as appropriate unless departing from the spirit of the present invention. The scope of the present invention therefore should not be interpreted as being limited by the specific examples illustrated below.

The measurement methods used in the examples and the comparative examples are described below.
[Scanning Electron Microscope Observation]
The electrode cross section was observed as follows. After the electrode was encapsulated in epoxy resin, a slice piece was prepared. The cross section was observed with a scanning electron microscope (SEM, JSM-7001F manufactured by JEOL Ltd., acceleration voltage: 15 kV).
[Powder X-Ray Diffraction Analysis]
The structural analysis of the synthesized sample was conducted using a powder X-ray diffraction analyzer (RINT 2200 manufactured by Rigaku Corporation, measurement conditions: step width 0.02°, source CuKα, λ=1.541 Å, tube voltage 40 kV, tube current 30 mA).
[Charge/Discharge Characteristic]
The charge/discharge characteristic of the fabricated lithium secondary battery was evaluated by conducting a constant-current charge/discharge test using a battery charge/discharge measurement system (HJR-1010 mSM8A manufactured by HOKUTO DENKO CORPORATION). The current density was set in a range of 17.5 mAg$^{-1}$ to 1750 mAg$^{-1}$ (0.1 C to 10 C: 1 C (175 mAg$^{-1}$) is a current density at which the active material reaches its theoretical capacity in one hour), with the voltage range of 1.2 V to 3.0 V, and with the measurement temperature of 25° C. or 0° C.

Synthesis Example 1: Preparation of Electrode Active Material (LTO)

To 400 mL of distilled water, 25.6 g of oxalic acid dihydrate and 3.2 g of lithium carbonate were added and dissolved. Subsequently, 29.2 g of titanium tetraisopropoxide dissolved in 20 mL of ethanol in advance was added and stirred at 80° C. for three hours. The product was thereafter dried using a spray drier (SD-1000 manufactured by TOKYO RIKAKIKAI CO, LTD., drying conditions: inlet temperature 160° C., outlet temperature 100° C., spray pressure 100 kPa, hot air volume 0.7 m$^3$/minute, flow rate 400 mL/hour), and baked at 800° C. (temperature increase/decrease rate: 1° C./minute) for 12 hours. The powder X-ray diffraction analysis indicated that the resultant electrode active material was cubic, space group Fd-3m, lithium-rich LTO.

Synthetic Example 2: Preparation of Aqueous Binder (Pulverized Cellulose Fiber Water Dispersion Liquid)

Five parts by mass of a commercially available cellulose powder (Fibra-Cell BH-100 manufactured by Celite Corporation) was dispersed into 495 parts by mass of pure water and subjected to a pulverization process (Star Burst System manufactured by Sugino Machine Limited) (200 MPa, 50 Passes), resulting in a pulverized cellulose fiber water dispersion liquid. The obtained cellulose fiber water dispersion liquid was measured into a petri dish and dried at 110° C. for five hours to remove water. The amount of the residual was measured, and the concentration was thereby measured. The resulting pulverized cellulose fiber concentration (solid concentration) in water was 0.74% by mass.

Example 1

Preparation of Slurry Composition for Forming Lithium Secondary Battery Electrode, Electrode, and Coin Cell-Type Secondary Battery The electrode active material obtained in Synthesis Example 1, an electron conduction assistant (acetylene black (DENKA BLACK manufactured by DENKI KAGAKU KOGYO KABUSHIKI KAISHA)), and the aqueous binder obtained in Synthesis Example 2 (the pulverized cellulose fiber water dispersion liquid) were weighed at a mass ratio of 88:6:6 and mixed for about 15 minutes using an agate mortar to prepare a slurry composition for forming a lithium secondary battery electrode.

Figure 1:
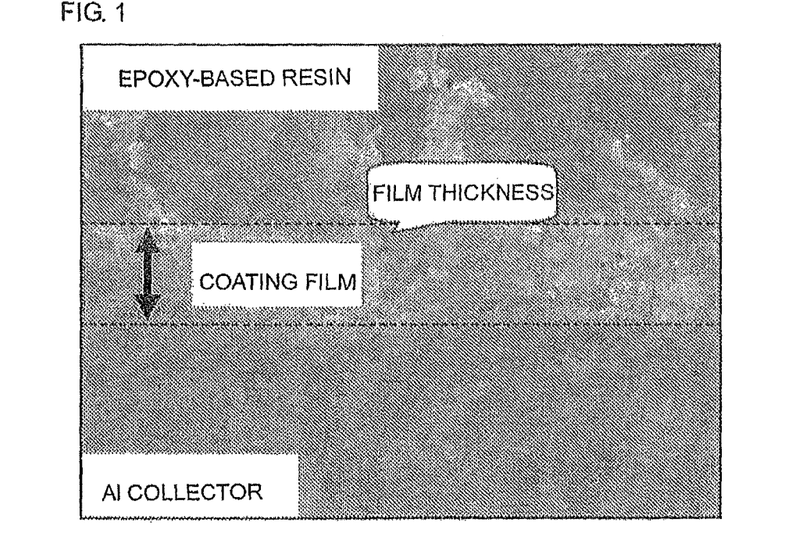
FIG. 1 shows a scanning electron microscope photograph of a cross section of an electrode fabricated in Example 1.

Subsequently, an aluminum foil (manufactured by Hohsen Corp., thickness 20 μm) serving as an electrode collector was coated by a doctor blade process and dried at 80° C. for three hours using a drier. The aluminium foil coated with an electrode layer was thereafter roll-pressed and then punched using a cork borer. The disk-shaped product was dried at 80° C. for 12 hours in a vacuum. The cross section of the resulting electrode was observed using a scanning electron microscope, and the thickness was 7 μm (FIG. 1).

A lithium secondary battery was fabricated using the electrode obtained in this example and metal lithium as the opposite electrode. As the lithium secondary battery, an R2032 coin cell-type secondary battery was fabricated in accordance with an ordinary method.

The fabrication procedure of the coil cell is as follows. An R2032 coin-type cell was fabricated using the electrode obtained in this example as a positive electrode, a metal lithium foil (manufactured by Honjo Chemical Corporation) punched in a diameter of 12 mm as a negative electrode, 1 mol·dm$^{-3}$LiPF$_6$/(ethylene carbonate: dimethyl carbonate=30:70% by mass) (manufactured by Mitsubishi Chemical Corporation, water content 20 ppm or less) as an electrolyte solution, and #2325 manufactured by Celgard, LLC. (thickness 25 μm, porosity 40%, air permeability 620 seconds as a separator. The fabrication of the lithium secondary battery was performed in a glove box at room temperature under a dry argon atmosphere.

Example 2

Figure 2:
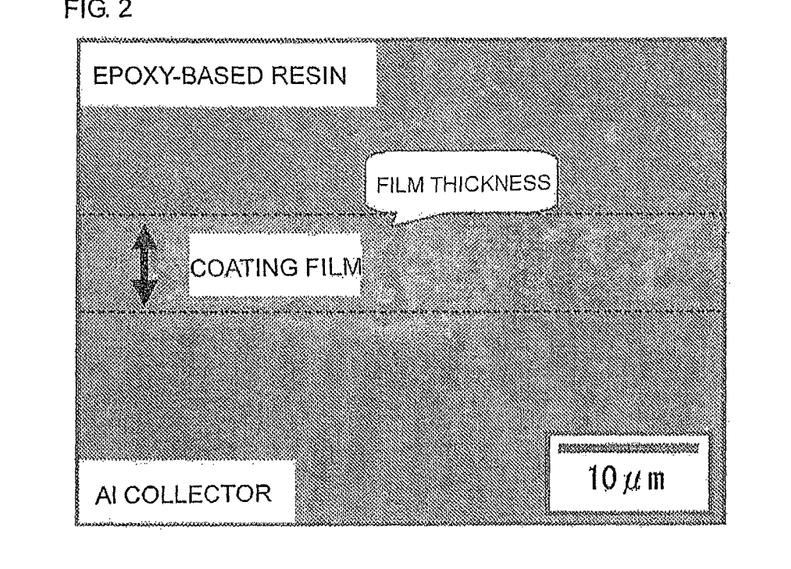
FIG. 2 shows a scanning electron microscope photograph of a cross section of an electrode fabricated in Example 2.

A slurry composition for forming a lithium secondary battery electrode and an electrode were fabricated by the same method as in Example 1 except that the electrode active material obtained in Synthesis Example 1, an electron conduction assistant (acetylene black (DENKA BLACK manufactured by DENKI KAGAKU KOGYO KABUSHIKI KAISHA)), and the aqueous binder obtained in Synthesis Example 2 were weighed at a mass ratio of 92:6:2. The cross section of the resulting electrode was observed with a scanning electron microscope, and the film thickness was 7 μm (FIG. 2).

Subsequently, a coin cell-type secondary battery was fabricated by the same method as in Example 1.

Comparative Example 1

A slurry composition for forming a lithium secondary battery electrode and an electrode were fabricated by the same method as in Example 1 except that carboxymethyl cellulose (manufactured by Dai-ichi Kogyo Seiyaku Co., Ltd.) was used as an aqueous binder, and the mass ratio of the electrode active material obtained in Synthesis Example 1, an electron conduction assistant (acetylene black (DENKA BLACK manufactured by DENKI KAGAKU KOGYO KABUSHIKI KAISHA)), and the aqueous binder (carboxymethyl cellulose) was 88:6:6. A coin cell-type secondary battery was fabricated by the same method as in Example 1.

Comparative Example 2

A slurry composition for forming a lithium secondary battery electrode and an electrode were fabricated by the same method as in Example 1 except that polyacrylic acid (manufactured by Wako Pure Chemical Industries, Ltd.) was used as an aqueous binder, and the mass ratio of the electrode active material obtained in Synthesis Example 1, an electron conduction assistant (acetylene black (DENKA BLACK manufactured by DENKI KAGAKU KOGYO KABUSHIKI KAISHA)), and the aqueous binder (polyacrylic acid) was 88:6:6. A coin cell-type secondary battery was fabricated by the same method as in Example 1.

Comparative Example 3

A slurry composition for forming a lithium secondary battery electrode and an electrode were fabricated by the same method as in Example 1 except that polyvinylidene fluoride (PVdF manufactured by KUREHA CORPORATION) was used as a nonaqueous binder, and the mass ratio of the electrode active material obtained in Synthesis Example 1, an electron conduction assistant (acetylene black (DENKA BLACK manufactured by DENKI KAGAKU KOGYO KABUSHIKI KAISHA)), and the nonaqueous binder was 88:6:6. A coin cell-type secondary battery was fabricated by the same method as in Example 1.

[Applicability]

The applicability of the slurry compositions for forming a lithium secondary battery electrode prepared in Example 1 and Example 2, and Comparative Example 1 to Comparative Example 3 on the aluminum foil serving as an electrode collector was evaluated by visual inspection. Table 1 shows the evaluation results.

[Environmental Load]

The dispersion media used for the slurry compositions were evaluated in view of environmental conservation.

[Charge/Discharge Rate Characteristic (Charge/Discharge Curve)]

The lithium secondary batteries fabricated in Example 1 and Example 2, and Comparative Example 1 to Comparative Example 3 were charged to 1.2 V at 25° C. with a constant current of 0.1 C, 0.5 C, 1 C, 2 C, or 3 C (1 C=175 mAg$^{-1}$) and then discharged to 3.0 V under the same constant current conditions as in the charging. This charge/discharge cycle was repeated five times at each of the current densities. Charge/discharge was then performed five times under a condition of 0.1 C (a loop of 1.2 V-3.0 V), and the charge/discharge rate characteristic was then evaluated under a condition of 1 C (a loop of 1.2 V-3.0 V). The capacity in charging to 3 V at a ratio of 1 C and 3 C was evaluated as the battery capacity of each lithium secondary battery. Table 1 shows the evaluation results.

Figure 3:
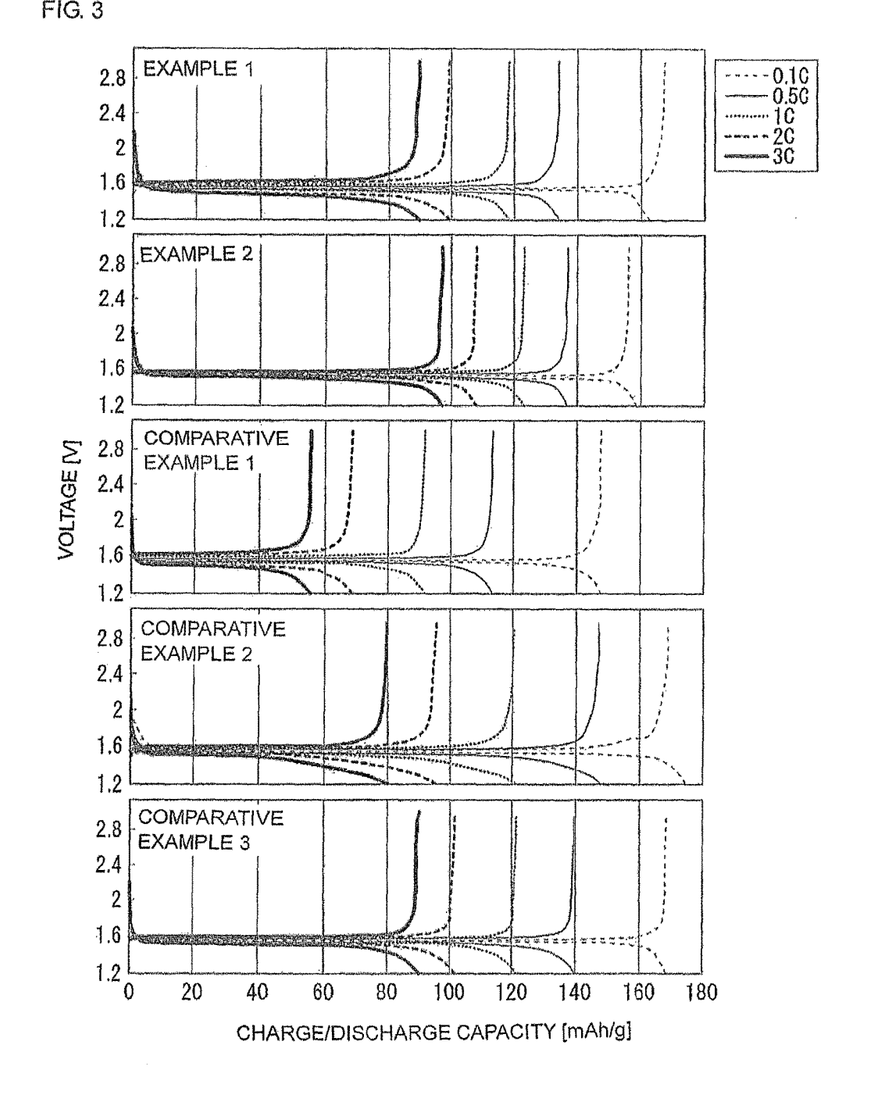
FIG. 3 is a graph showing charge/discharge rate characteristics (charge/discharge curves) at 25° C. when the charge/discharge rate is changed from 0.1 C to 3 C in lithium secondary batteries fabricated in Example 1, Example 2, and Comparative Example 1 to Comparative Example 3.

FIG. 3 shows the charge/discharge rate characteristics (charge/discharge curves) where the charge/discharge rate is changed from 0.1 C to 3 C (1 C=175 mAg$^{-1}$).

As shown in Table 1 and FIG. 3, the secondary batteries produced in Example 1 and Example 2 exhibit the charge/discharge rate characteristic equivalent to that of Comparative Example 3 using polyvinylidene fluoride as a binder.

TABLE 1

| | Kind of binders | Negative electrode composition ratio*1 | Applicability*2 | Environmental load*3 | Charge/discharge capacity (mAg$^{-1}$) | |
| --- | --- | --- | --- | --- | --- | --- |
| | | | | | 1 C | 3 C |
| Example 1 | Cellulose fiber | 88/6/6 | ○ | ○ | 120 | 90 |
| Example 2 | Cellulose fiber | 92/6/2 | ○ | ○ | 125 | 95 |
| Comparative Example 1 | Carboxymethyl cellulose | 88/6/6 | Δ | ○ | 90 | 55 |
| Comparative Example 2 | Polyacrylic acid | 88/6/6 | Δ | ○ | 120 | 80 |

TABLE 1-continued

| | Kind of binders | Negative electrode composition ratio*[1] | Applicability*[2] | Environmental load*[3] | Charge/discharge capacity (mAg$^{-1}$) 1 C | 3 C |
|---|---|---|---|---|---|---|
| Comparative Example 3 | Polyvinylidene fluoride | 88/6/6 | ○ | X | 120 | 90 |

*[1]LTO/acetylene black/binder
*[2]○: good, Δ: applicable but lack in homogeneity, X: difficult to apply, evaluation impossible
*[3]○: dispersion medium is water, X: dispersion medium is organic solvent (N-methyl-2-pyrrolidone)

[Charge/Discharge Cycle Characteristics]

The lithium secondary batteries fabricated in Example 1 and Example 2, and Comparative Example 1 to Comparative Example 3 were charged to 1.2 V at 25° C. with a constant current of 0.1 C, 0.5 C, 1 C, 2 C, or 3 C (1 C=175 mAg$^{-1}$) and then discharged to 3.0 V under the same constant current conditions as in the charging. This charge/discharge cycle was repeated five times at each of the current densities. Charge/discharge was then performed five times under a condition of 0.1 C (a loop of 1.2 V-3.0 V), and the charge/discharge cycle characteristics was then evaluated under a condition of 1 C (a loop of 1.2 V-3.0 V).

Figure 4:
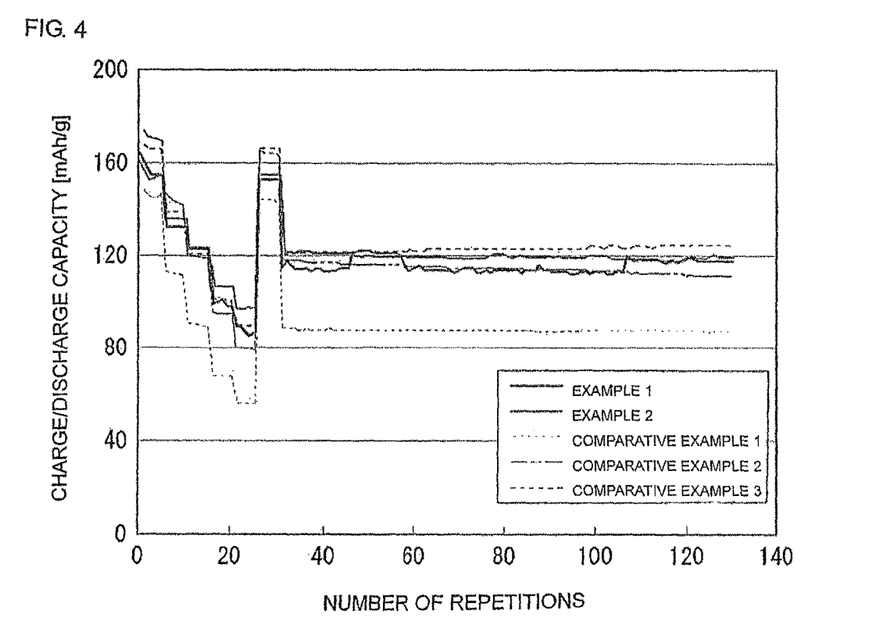
FIG. 4 is a graph showing charge/discharge cycle characteristics at 25° C. of the lithium secondary batteries fabricated in Example 1, Example 2, and Comparative Example 1 to Comparative Example 3.

FIG. 4 shows the charge/discharge cycle characteristics of the lithium secondary batteries fabricated in the examples and the comparative examples. In view of the cycle characteristics with 30 times or more 1 C constant current charge/discharge, the discharge capacity of Comparative Example 1 and Comparative Example 2 gradually decreases when compared with Example 1 and Example 2.

[Low Temperature Characteristic]

The lithium secondary batteries fabricated in Example 1, Comparative Example 2, and Comparative Example 3 were charged to 1.2 V at 0° C. with a constant current of 0.1 C, 0.5 C, 1 C, 2 C, 3 C, 5 C, or 10 C (1 C=175 mAg$^{-1}$) and then discharged to 3.0 V under the same constant current conditions as in the charging. This charge/discharge cycle was repeated five times at each of the current densities. Charge/discharge was then performed five times under a condition of 0.1 C (a loop of 1.2 V-3.0 V), and the charge/discharge cycle characteristics at low temperature (0° C.) was evaluated.

Figure 5:
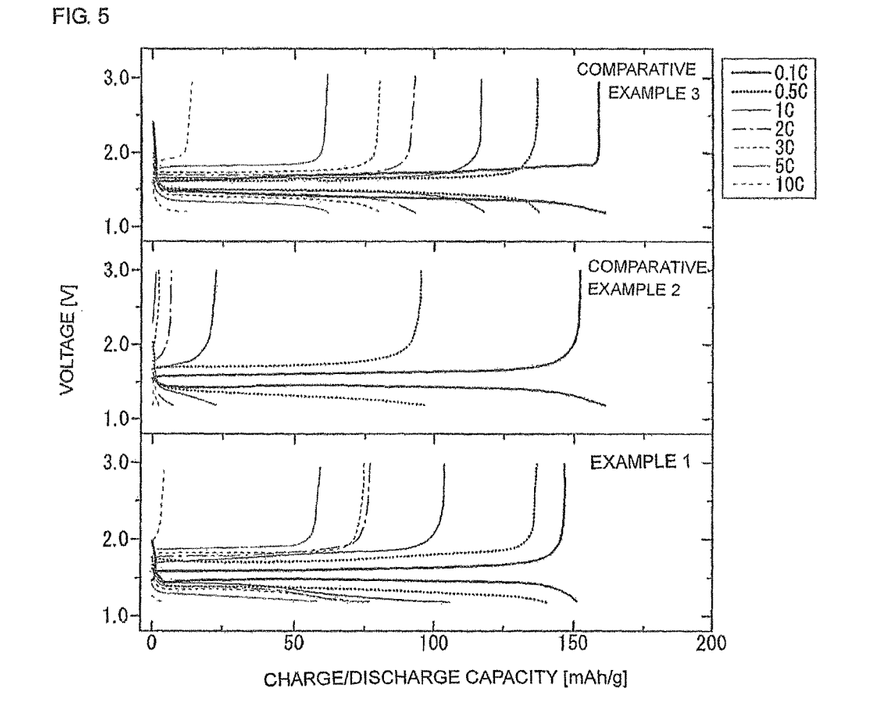
FIG. 5 is a graph showing charge/discharge rate characteristics (charge/discharge curves) at 0° C. of the lithium secondary batteries fabricated in Example 1, Comparative Example 2, and Comparative Example 3.
Figure 6:
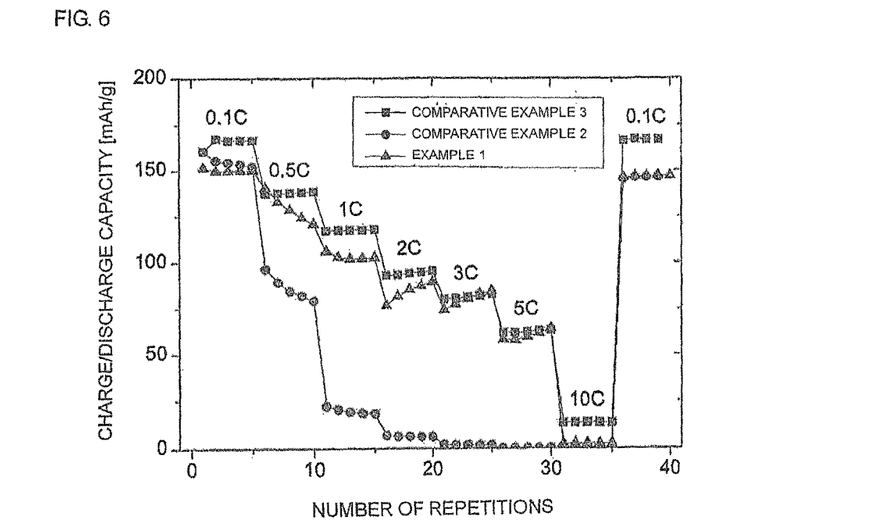
FIG. 6 is a graph showing charge/discharge rate characteristics (cycle characteristics) at 0° C. of the lithium secondary batteries fabricated in Example 1, Comparative Example 2, and Comparative Example 3.

FIG. 5 shows the charge/discharge rate characteristics (charge/discharge curves) at low temperature (0° C.) of the lithium secondary batteries fabricated in Example 1, Comparative Example 2, and Comparative Example 3, and FIG. 6 shows the charge/discharge rate characteristics (cycle characteristics). As shown in FIG. 5 and FIG. 6, the secondary battery fabricated in Example 1 exhibits the discharge capacity approximately equivalent to that of Comparative Example 3 using polyvinylidene fluoride as a binder, at each current density. In view of the current density of 0.5 C or more, in Comparative Example 2 using a conventional water-soluble polymer (polyacrylic acid) as a binder, the discharge capacity significantly decreases in accordance with increase in current density when compared with Example 1.

The invention claimed is:

1. A slurry composition for forming a lithium secondary battery electrode, comprising:
    an electrode active material (A);
    a conductive assistant (B); and
    a pulverized cellulose fiber (C) as an aqueous binder,
    wherein
    the pulverized cellulose fiber (C) has a particle diameter of 0.01 μm to 40 μm at 50% of cumulative volume, which is measured using a laser diffraction/scattering particle size distribution analyzer with water serving as a dispersion medium, and an aspect ratio (L/D) of 10 to 10,000, and
    the electrode active material (A) is a lithium-transition metal phosphate or a lithium-transition metal oxide.

2. The slurry composition for forming a lithium secondary battery electrode according to claim 1 wherein
    the pulverized cellulose fiber (C) is prepared by a wet milling process selected from the group consisting of a high-pressure homogenizer, a grinder, and a medium stirring mill.

3. The slurry composition for forming a lithium secondary battery electrode according to claim 1, wherein
    the pulverized cellulose fiber (C) is prepared from a plant-derived cellulose or a bacteria cellulose.

4. The slurry composition for forming a lithium secondary battery electrode according to claim 1, wherein
    the electrode active material (A) is a lithium-titanium composite oxide.

5. The slurry composition for forming a lithium secondary battery electrode according to claim 1, wherein
    the conductive assistant (B) is graphite powder, carbon black, a carbon nanotube, or a carbon nanofiber.

6. A lithium secondary battery electrode comprising:
    an electrode collector; and
    a layer formed on the electrode collector using the slurry composition for forming a lithium secondary battery electrode as claimed in claim 1.

7. A lithium secondary battery comprising the lithium secondary battery electrode as claimed in claim 6 as a positive electrode, a negative electrode, or a positive electrode and a negative electrode.

8. An aqueous binder for forming an electrode layer including a lithium-transition metal phosphate or a lithium-transition metal oxide as an electrode active material (A) and a conductive assistant (B) on an electrode collector, the aqueous binder comprising a pulverized cellulose fiber (C) having a particle diameter of 0.01 μm to 40 μm at 50% of cumulative volume, which is measured using a laser diffraction/scattering particle size distribution analyzer with water serving as a dispersion medium, and an aspect ratio (L/D) of 10 to 10,000.

9. The slurry composition for forming a lithium secondary battery electrode according to claim 1 wherein
    the electrode active material (A) is iron-lithium phosphate.

* * * * *